Aug. 21, 1951  G. A. MASON ET AL  2,564,852
BEVERAGE MIXER AND DISPENSER
Filed March 27, 1948　　　　　　　　　　　　　　2 Sheets-Sheet 1
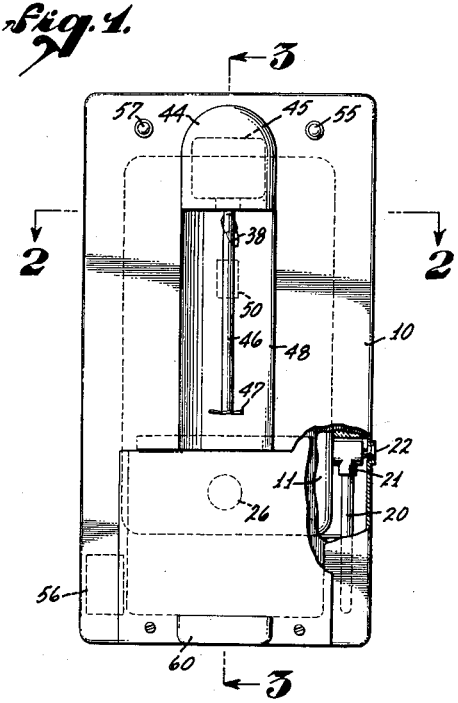
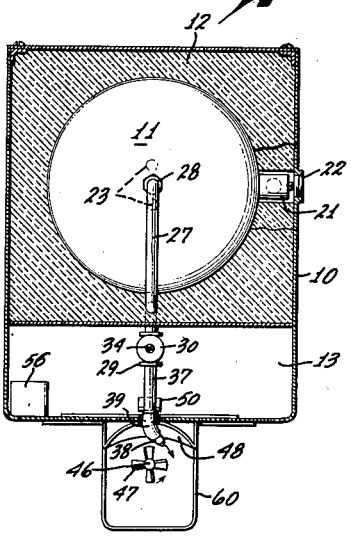
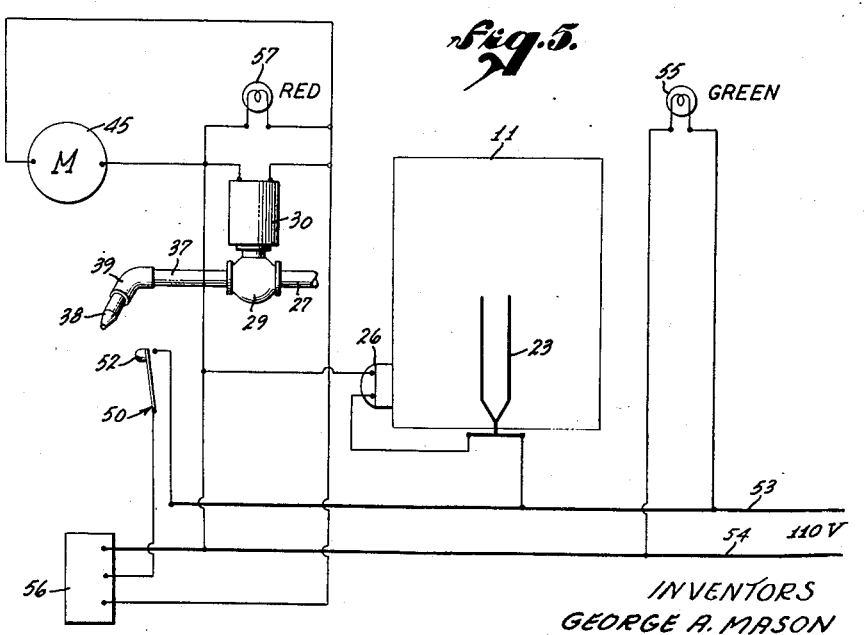
INVENTORS
GEORGE A. MASON
WILLIAM B. HARRIS
BY Huebner, Maltby
and Beehler
ATTORNEYS.

Aug. 21, 1951 G. A. MASON ET AL 2,564,852
BEVERAGE MIXER AND DISPENSER
Filed March 27, 1948 2 Sheets-Sheet 2

INVENTORS
GEORGE A. MASON
WILLIAM B. HARRIS
BY Huebner, Maltby
and Beehler
ATTORNEYS.

Patented Aug. 21, 1951

2,564,852

UNITED STATES PATENT OFFICE 2,564,852

BEVERAGE MIXER AND DISPENSER

George A. Mason, Pasadena, and
William B. Harris, Bell, Calif.

Application March 27, 1948, Serial No. 17,444

2 Claims. (Cl. 259—24)

This invention relates to dispensers and has particular reference to a dispensing device which is adapted to dispense measured quantities of hot liquid and which may be churned with certain other ingredients such as, for example, instantaneous hot chocolate.

During recent years there have appeared on the market a great many types of instantaneous beverages which have taken the form of powder adapted to be mixed with hot or boiling water. Familiar among these instantaneous drink preparations is instantaneous coffee, malted milk and also chocolate powder in which there has been mixed predetermined quantities of dry powdered milk and sugar. Preparations of the character of powdered hot chocolate usually require rather considerable mixing in order to be in proper form for serving due in most cases to the reluctance of food ingredients in the nature of chocolate to readily mix with liquid and even boiling water. It has been supposed that one of the reasons for the inability to readily mix powdered chocolate is because of the fact that the powder contains a substantial amount of oil and also because the chocolate bean, no matter how finely powdered, presents a material insoluble in water; hence, all mixtures are nothing more than a suspension of solid particles in the water which will settle out sooner or later depending upon the fineness of the particles, the degree of mixing and perhaps the presence of other ingredients.

Heretofore the common practice in dispensing establishments such as drug stores, fountains, and the like, has been to mix the hot chocolate by hand by placing in a shaker cup a measured amount of hot water and the powdered prepared chocolate and thereafter mixing the two together in a mixing device of the type ordinarily used for milk shakes. This hand dispensing operation is time-consuming because of the necessity of measuring the ingredients including the hot water and also because of the extent of mixing necessary before the mixed drink is ready for serving. In busy establishments where space behind the counter is at a premium, the dispensing of hot chocolate drinks is a liability, especially during rush hours, rather than being a profitable phase of the business.

It is therefore among the objects of the invention to provide a new and improved dispensing machine for beverages of the nature of prepared hot chocolate which is rapid in its operation and economical in the consumption of time necessary to completely prepare, mix and make a drink ready for serving.

Another object of the invention is to provide a new and improved dispensing device which is ready at all times to dispense into a receptacle a measured amount of hot water or other liquid at precisely the right temperature.

Still another object of the invention is to provide a new and improved dispenser for mixed beverages of the nature of hot chocolate which makes possible great economy in the time necessary to prepare and make a drink ready for serving and which is equally economical in the consumption of power for heating and mixing the drink as well as in the quantity of ingredients used.

Still another object of the invention is to provide a new and improved dispensing device for drinks in the nature of hot chocolate which is especially thorough in the mixing of the dry ingredients with the hot liquids and which is simple to operate, easy to clean and particularly inexpensive to maintain and service throughout periods of constant use.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a front elevational view of the device.

Figure 2 is a cross-sectional view taken on the line 2—2 of Figure 1.

Figure 5 is a wiring diagram of the parts utilized in the device.

Figure 3:
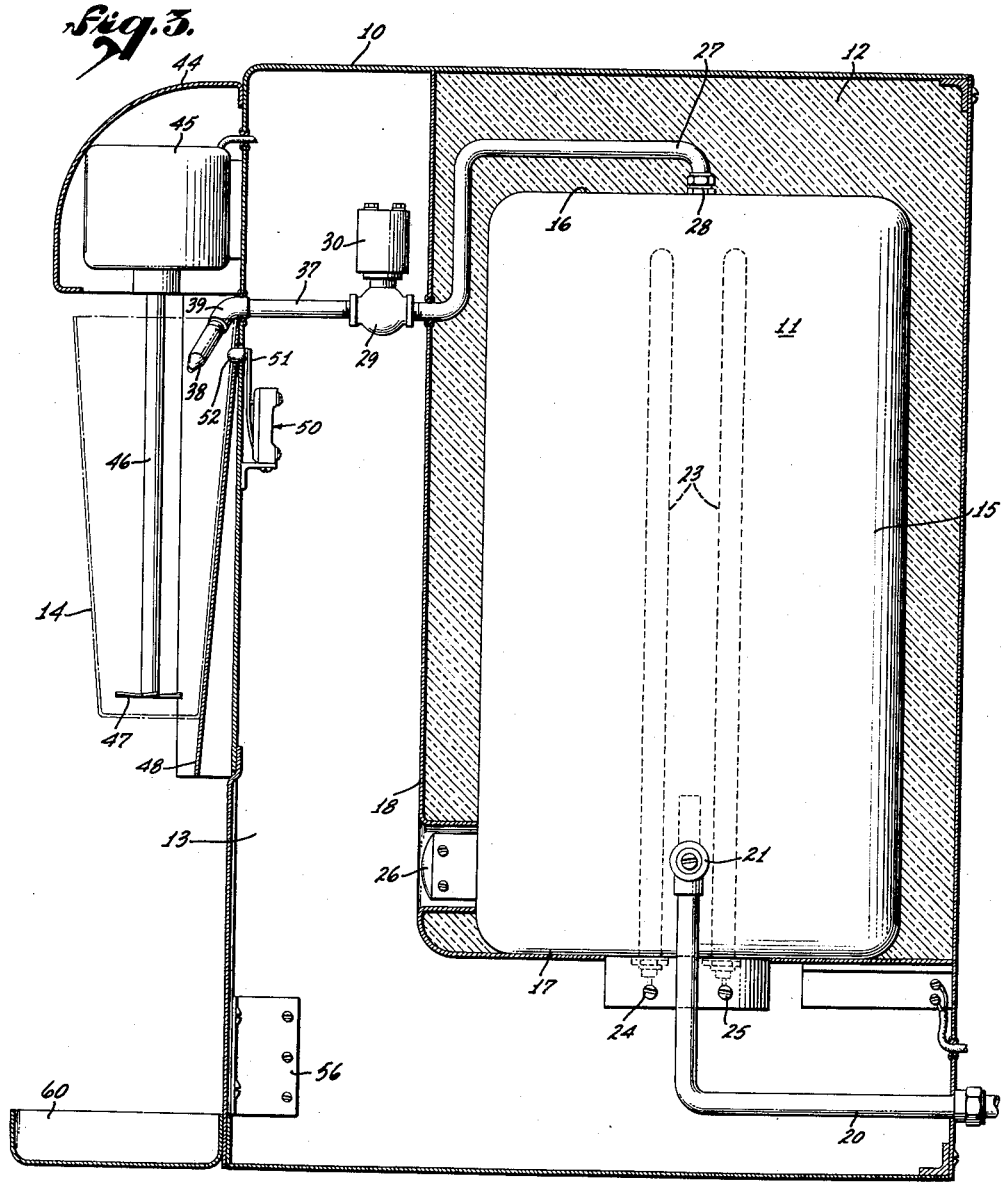
Figure 3 is a longitudinal sectional view of the device taken on the line 3—3 of Figure 1 and drawn to a larger scale.

To appreciate the advance made in dispensing a mixed drink by the apparatus which comprises the subject matter of this invention it should be borne in mind that devices of this kind are most useful in large establishments where great numbers of customers are accommodated at one time and where speed in making and serving the drinks is of utmose importance. The strides which have been taken by drug stores and soda fountains where drinks and food are served over counters after being prepared in a service area of very limited proportions are common knowledge. In such establishments the service area by careful design has been limited to an area no greater than that absolutely essential to accommodate preparation of food and drink. Virtually every square foot of table space and counter space is accounted for. Passageways for waitresses and persons engaged in the business of preparation behind the counters have been reduced to a minimum and the necessity for persons moving about behind the counter has been reduced so that the fewest possible number of steps may be taken. During rush hours when great numbers of people are waiting to sit at the counter, every minute that can be saved in the preparation of the food and drink is a valuable asset to the establishment. To this end wherever possible the preparation of food and drink has been mechanized. This is evident in the presence of malted milk mixers, dispensers for carbonated beverages in the nature of cola drinks and root beer and automatic timers on toasters, coffee makers and the like. Wherever the preparation of food and drink is a purely hand operation it consumes too much time in the preparation during rush hours to make it a practicable sales item. This has been true particularly in the preparation and serving of hot chocolate made from a powdered chocolate preparation. On many occasions this item is actually taken off the menu during rush hours because of the time consumed in its preparation which requires a delay in the service of other items.

In the device comprising the subject matter of this invention a complete preparation of a cup quantity of hot chocolate is designed to be made in a matter of seconds. Test runs have demonstrated that a highly improved cup of hot chocolate can be made in the applicant's device in a matter of not more than seven seconds. The action of the dispenser is so rapid in fact that no cup holder is provided at the outlet for the liquid since the cup need be held there no more than a matter of seconds and therefore does not need to be supported for a time longer than it is necessary for the person engaged in the service to hold it by hand and then remove it immediately thereafter to pour into a serving cup.

As shown in the drawings the device consists of a casing 10 ordinarily constructed of sheet metal having sufficient size to accommodate a hot water reservoir 11, a mass of insulating material 12 and a space 13 adapted to house the mechanical devices upon which the device depends for successful operation. The casing is ordinarily made rather compact in size and its dimension can be judged by a comparison of the height of the casing with the height of a conventional milk shake cup 14 illustrated in dot and dash lines at the left of Figure 3.

As illustrated in detail in Figure 3, the reservoir 11 is shown as comprising a closed cylinder having a cylindrical side wall 15, a top 16 and a bottom 17. The insulation 12 surrounds the sides and top but may advantageously be omitted from the bottom. An inner wall 18 separates the insulation from the space 13.

Cold water is admitted to the reservoir through a pipe line 20, the admission of which is controlled by an adjustable needle valve 21 to which access may be had through a suitable plugged opening 22 in the casing.

Within the reservoir are located heating coils 23 which are provided with binding posts 24 and 25 outside of the bottom 17. A thermostat 26 is responsive to the temperature of liquid within the reservoir and controls the flow of electric current to the heating coils. Liquid within the reservoir may thus be maintained at a temperature close to the boiling point in the event that a temperature that high may be required.

Figure 4:
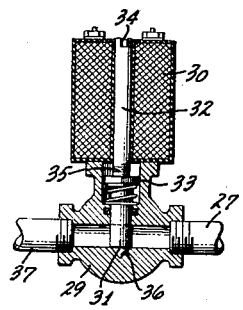
Figure 4 is a detailed view of a type of feed control solenoid operated valve.

Hot water from the reservoir is permitted to pass outwardly through an outlet pipe line 27, an inlet end 28 of which is at the top of the reservoir. In the outlet pipe line is a shut-off valve 29, the action of which is controlled by a solenoid 30. It has been found highly advantageous to have the shut-off valve 29 of such construction that a valve element 31, which may be operated by a core 32 of the solenoid, can be adjusted. Although various means may be provided to effect such an adjustment one such means is illustrated in Figure 4. This contemplates a head 33 on the valve stem of such configuration that it prevents rotation of the valve element but at the same time permits endwise movement thereof to and from a closed position. The solenoid core may be provided with a screw driver slot 34 and a threaded connection 35 with the valve element. Constructed in this way the valve element may be moved with respect to the position of the solenoid core and consequently when the solenoid is operated, the valve element will be lifted a greater or a lesser distance from a valve seat 36, depending upon the adjustment. Consequently when the solenoid is actuated for a given length of time, the amount of flow of hot liquid through the shut-off valve can be adjusted by making an adjustment of the valve element.

From the check valve an outlet pipe 37 is directed toward the front of the machine and has attached at its outer end a nozzle 38. Preferably a coupling joint 39 is used to attach the nozzle to the outlet pipe so that the nozzle may be removed if desired and in any event so that the nozzle outlet may be directed in its proper direction and there held in place.

In the upper left-hand corner of the device as viewed in Figure 3 there is provided an electric motor 45 fastened to the front wall of the casing from which depends a shaft 46 terminating at its bottom end in a churning wheel 47. A hood 44 is located on the front of the casing and adapted to overlie the motor 45. A curved plate 48 may be provided at the front of the casing to serve as a stop or rest against which the cup 14 may be placed while a beverage is being mixed therein.

A switch 50 is attached to the inside wall of the front of the casing, the switch being provided with an arm or armature 51 having a trip element 52 extending forward therefrom through the front wall of the casing. It is significant that the trip element 52 is located slightly below the level of the outlet pipe line and immediately behind the nozzle.

Before outlining a description of the operation of the device, an understanding of the wiring diagram and of the various electrically actuated parts is of advantage.

In Figure 5 there is illustrated a trunk line comprising wires 53 and 54 ordinarily emanating in an ordinary 110 volt electric circuit of the type commonly wired into houses and business establishments. The heating coils 23 are shown to be constantly in circuit with the 110 volt line as is also the thermostat 26 to which the heating coils are responsive. A green light 55 is in parallel circuit with the 110 volt line and is so connected as illustrated that the green light burns whenever the device is plugged into the trunk line.

Separately connected to the trunk line or 110 volt line are the parts which control the dispensing and churning or mixing of the beverage which is to be dispensed. Chief among these parts is a timer 56 and the timer as illustrated is in circuit with the switch 50 and is adapted to operate only when the switch is closed. In circuit with the timer is the solenoid 30, the motor 45 and a red light 57. When connected as illustrated as soon as the switch 50 has been closed, the timer is set in operation and immediately turns on, for a predetermined length of time, the solenoid 30, the motor 35 and the red light 57. By properly setting the timer the length of time during which the solenoid 30 opens the shut-off valve 29 can be so controlled as to admit a measured quantity of hot liquid to pass through the nozzle 38. If a 5-oz. cup is to be filled, then the timer can be set so that the solenoid permits delivery of five ounces of hot liquid through the nozzle. During this same length of time motor 35 will be operated. Consequently the motor will be effecting a churning or mixing of the liquid in a suitable cup or receptacle for as long as hot water is being ejected from the nozzle 38. As promptly as the timer disconnects the circuit through the solenoid permitting the shut-off valve 29 to close, the motor 45 is also shut off even though the switch 50 remains closed. Upon removal of the cup or receptacle and emptying it of the mixed beverage, the switch 50 is reset to open position and the device is immediately ready for the next dispensing operation.

Of singular importance is the relationship of the churning wheel 57 and the nozzle 38. This is apparent in Figure 1. For the churning wheel designed to operate in a counter-clockwise direction as viewed from the top as in Figure 2, the nozzle 38 is directed toward the right as viewed in Figure 1. With this relationship as the liquid and the powder which is mixed with it is rotated counter-clockwise, a remarkable increased turbulence is maintained by projecting a relatively fine stream of hot liquid from the nozzle 38 in a direction counter to rotation of the churning wheel. The power of the jet of liquid emerging from the nozzle can be made, by reason of a control of liquid pressure, to exert a powerful ebullience of liquid within the cup. This ebullience produced by the jet greatly improves the action of the churning wheel and even though the mixture of liquid and powdered prepared chocolate is subjected to the action for only a short length of time, a very thorough and intimate mixing takes place sufficient to maintain ingredients such as powdered chocolate in complete suspension in a liquid such as hot water or milk for a considerable length of time. During the churning period a very fine head of froth is generated at the top of the drink and it is the aroma and quality of this froth which further enhances the palatableness of the mixed beverage. By reason of the fact that rotation of the churning wheel ceases as soon as a measured quantity of hot liquid is ejected into the cup, the froth is not dissipated or broken as the cup is removed downwardly and the churning wheel thus pulled from its position beneath the surface of the liquid. Should any liquid drip from the churning wheel after removal of the cup it is adapted to be caught in a trough 60 located at the front of the casing beneath the wheel.

When the device is employed, ordinary powdered dry hot chocolate mix is placed in a cup. The cup is placed so that the upper rim is behind the nozzle 38 where it is retained close enough to the front wall of the casing so that it depresses the switch arm 51 to a position closing the switch 50. Because of the location of the nozzle in front of the switch, the nozzle is bound to be directed toward the interior of the cup before the switch is closed and the liquid starts running. Accidental discharge of hot water out of the reservoir is thereby eliminated. Churning of the wheel 47 is also restrained until the liquid starts running and the cup is properly in place. The churning and mixing action is completed in a very short space of time, being a length of time no longer than that necessary to project five ounces of liquid into the cup whereupon all action ceases and the cup may be removed for pouring.

Careful adjustment is provided for in that the inlet for cold water into the reservoir may be adjusted, the rate of flow from the outlet may be adjusted by adjustment of the valve element 31 and the time of operation may be adjusted by suitably manipulating the timer 56 which may be any one of a number of commercial timers available on the market. Quick positive operation is thereby assured by a dispenser device in which there is provided no more than those elements essential for proper carefully controlled operation. Virtually all working parts are carefully concealed within the casing thereby minimizing cleaning operations. The mechanical controls and devices, however, are maintained in a suitable space separate from the reservoir so that by removal of a portion of the casing at the front of the device ready access may be had to those parts which might be in need of adjustment from time to time. The device may be installed by making no more than one connection to a cold water line and an ordinary plug-in connection to the conventional 110 volt lighting circuit.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A dispenser and mixer for beaten drinks in the nature of hot chocolate comprising a reservoir for hot liquid under pressure and a hot liquid outlet line from said reservoir, an electric responsive valve device in the outlet line, a downwardly directed nozzle at the end of the outlet line, a cup and a support therefor beneath the nozzle, a beater shaft adjacent the nozzle adapted to extend into the cup and having a motor at one end and a beater at the other end, an electric switch adjacent the nozzle subject to actuation by the cup when in position on the support, and a timer in circuit respectively with the switch, the motor, and the electric responsive valve device whereby when said switch is closed, a measured quantity of liquid under pressure is admitted past said valve device and ejected from said nozzle and said beating action of the beater in the cup is simultaneously initiated and continues for the duration only of said ejection of said liquid.

2. A dispenser for beaten drinks comprising a casing, a reservoir in the casing subject to liquid pressure, a pressure outlet line from the reservoir terminating in a jet nozzle, an open cup, a receiver on the casing for said cup, a vertical beater shaft adjacent the receiver having a beater on the lower end adapted to be received near the bottom of the cup when in place on said receiver, a motor on said shaft attached to the casing adapted to rotate said shaft in a preselected direction, said nozzle being located adjacent and within the top of the cup and projected in a direction obliquely downward and in a direction opposed to the direction of rotation of said beater, automatic starting means adapted to simultaneously initiate flow of liquid from the nozzle and rotation of said beater, and automatic timing means adapted to stop simultaneously the flow from the nozzle at full cup displacement and the rotation of said beater after the lapse of a predetermined length of time, said last means being operable independently of the starting means.

GEORGE A. MASON.
WILLIAM B. HARRIS.

REFERENCES CITED

The following references are of record in the file of this patent:

UNITED STATES PATENTS

| Number | Name | Date |
|---|---|---|
| 1,115,518 | Dwiggins | Nov. 3, 1914 |
| 1,187,061 | Gulick | June 13, 1916 |
| 1,189,579 | Kelley | July 4, 1916 |
| 1,521,038 | Moore | Dec. 30, 1924 |
| 1,683,500 | Thordarson | Sept. 4, 1928 |
| 1,920,284 | Wells | Aug. 1, 1933 |
| 2,144,465 | Selleck | Jan. 17, 1939 |
| 2,284,880 | Nicholson | June 2, 1942 |